UNITED STATES PATENT OFFICE.

ISAAC P. WENDELL, OF PHILADELPHIA, PENNSYLVANIA, ASSIGNOR TO CHARLES P. TASKER, OF SAME PLACE.

COMPOSITION OF MATTER FOR THE MANUFACTURE OF AXLE-BEARINGS.

SPECIFICATION forming part of Letters Patent No. 325,888, dated September 8, 1885.

Application filed February 14, 1885. (No specimens.)

*To all whom it may concern:*

Be it known that I, ISAAC P. WENDELL, a citizen of the United States, residing at Philadelphia, in the county of Philadelphia and State of Pennsylvania, have invented a new and useful Composition of Matter, of which the following is a specification.

The object of my invention is to provide an inexpensive material having the proper hardness and durability for the manufacture of axle or journal bearings, packings for pistons, and like articles.

My invention consists in a compound composed of asbestus, talc or soapstone, sulphur, plumbago, and silicate of soda. The asbestus, having first been reduced to a condition of fiber or powder, is, with talc, sulphur, and plumbago in a powdered condition, well mixed with liquid silicate of soda, molded into the desired form, and dried by artificial or natural heat.

The proportions of the materials above named which I have found to produce a good article are, two pounds of asbestus, one pound of talc or soapstone, one-eighth of a pound of sulphur, one-quarter of a pound of plumbago, and three and one-half pounds of liquid silicate of soda, or the corresponding amount of crystallized silicate of soda, or the corresponding amount of other equivalent indurating material. These proportions, however, may be varied, and forms of carbon other than plumbago may be employed, without departing from my invention.

Having thus described my invention, I claim—

A composition of matter consisting of asbestus, talc or soapstone, sulphur, plumbago, and silicate of soda, substantially as set forth.

In testimony whereof I have hereunto signed my name this 3d day of February, A.D. 1885.

ISAAC P. WENDELL.

In presence of—
WM. C. STRAWBRIDGE,
J. BONSALL TAYLOR.